United States Patent [19]

Logan et al.

[11] 4,155,624
[45] May 22, 1979

[54] DUPLEX OPTICAL FIBER CONNECTOR

[75] Inventors: Maurus C. Logan, Elizabeth, N.J.; John M. Cole, New Hope, Pa.; Peter Garner, Chatham, N.J.

[73] Assignee: Thomas & Betts Corporation, Raritan, N.J.

[21] Appl. No.: 840,384

[22] Filed: Nov. 4, 1977

Related U.S. Application Data

[63] Continuation-in-part of Ser. No. 754,089, Dec. 23, 1976, abandoned.

[51] Int. Cl.² .................................................. G02B 5/14
[52] U.S. Cl. .................................................. 350/96.21
[58] Field of Search ................. 350/96.20, 96.21, 96.22

[56] References Cited

U.S. PATENT DOCUMENTS

| | | | |
|---|---|---|---|
| 3,946,467 | 3/1976 | Lukas et al. | 350/96.20 |
| 4,029,390 | 6/1977 | Chinnock et al. | 350/96.21 |
| 4,045,121 | 8/1977 | Clark | 350/96.21 |
| 4,088,386 | 5/1978 | Hawk | 350/96.21 |

Primary Examiner—John K. Corbin
Assistant Examiner—Stewart Levy
Attorney, Agent, or Firm—David Teschner; Jesse Woldman

[57] ABSTRACT

The subject device is a connector for flexible elastically deformable elongate members having two mating halves, portions of which overlie one another. Within such overlying portions extend passages for receiving and holding the elongate members, the passages made up of a V-notch groove and a confronting flat surface or a rectangular recess which deforms the elongate member at three points, centering the members and bringing them to an end-to-end relationship. Additional elements are added for strain relief, centering, latching and position control.

17 Claims, 28 Drawing Figures

DUPLEX OPTICAL FIBER CONNECTOR

CROSS-REFERENCES TO RELATED APPLICATIONS

This Application is a continuation in part of pending U.S. patent application Ser. No. 754,089 filed Dec. 23, 1976 now abandoned entitled "Duplex Optical Fiber Connector" in the names of Maurus C. Logan, John M. Cole and Peter Garner and assigned to the assignee of the instant invention.

BACKGROUND OF THE INVENTION

1. Field of the Invention

The invention is directed to a device for joining two or more flexible, elastically deformable elongate members together and, more particularly, a coupler for joining two or more sets of flexible, elastically deformable optical fibers in an end-to-end relationship whereby energy in one fiber can be transferred to its associated fiber through such connector with minimum losses at the connector.

2. Description of the Prior Art

Prior art devices generally were used with rigid, inflexible members, such as glass fibers, which, if deformation forces were applied, would fracture or break. Accordingly, the connectors of the prior art were made of resilient, elastically deformable materials. Fibers placed in a common groove, and having a compression member applied thereover, tend to align themselves along their longitudinal axis. Such effects are not possible with elastically deformable fibers, since they deform rather than the portions of the connector.

SUMMARY OF THE INVENTION

The connector of the instant invention overcomes the difficulties noted above with respect to the prior art by providing a suitable connector for joining at least two flexible, elastically deformable optical fibers in an end-to-end relationship. Two members are used to hold each of the fibers to be joined, one with a V-notch therein and one with either a flat surface or a rectangular recess therein. The two members are positioned such that each of the fibers to be joined is subjected to a two point force along a V-notch and a third force point along either the flat surface or the rectangular recess. The three contact points tend to cause the fibers to uniformly deform along a common longitudinal axis. The connector also has means to provide strain relief to the joint and means to mount the connector to a wall, bulkhead, or the like. It is therefore an object of this invention to provide a novel connector for elongate objects.

It is another object of the invention to provide a novel connector for optical fibers.

It is still another object of the invention to provide a novel connector for flexible, elastically deformable optical fibers.

It is still another object of the invention to provide a connector having two mating halves, each with a V-notch and a rectangular recess whereby fibers placed between the mating halves are each subjected to forces along three lines.

It is yet another object of the invention to provide a connector having two mating halves, one with V-notches and the other with a confronting flat surface whereby fibers placed between the mating halves are each subjected to forces along three lines.

Other objects and features of the invention will be pointed out in the following description and claims and illustrated in the accompanying drawings, which disclose, by way of example, the principles of the invention and the best mode which has been contemplated for carrying it out.

BRIEF DESCRIPTION OF THE DRAWING

In the drawings in which like elements are given like reference characters.

DESCRIPTION OF THE PREFERRED EMBODIMENT

Turning now to FIGS. 1 to 10, there is shown a connector 20 used to join at least two flexible, elastically deformable elongate members such as optical fibers 22,24. Connector 20 is used not only to join the fibers but also to support same with respect to a wall 26 or bulkhead or the like. It should be understood, however, that the connector shown herein, and others constructed according to the concepts disclosed herein, need not support fibers to such mounting members. A mounting bolt 28 has a flange 30 to engage a side 32 of wall 26 and is threadingly engaged by a jam nut 34 having wrench flats 36 thereon on the other side 38 of wall 26. The jam nut 34 can be made tight against side 38 to grip wall 26 between flange 30 and jam nut 34. Coupled over the threaded portion 40 of the mounting bolt 28 is the cam nut 42 having a splined end portion 44 to facilitate the tightening of the cam nut 42 on the mounting bolt 38 threaded portion 40.

Figure 1:
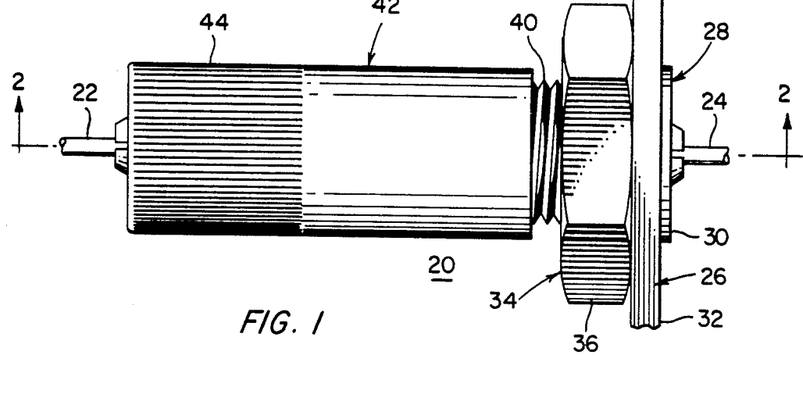
FIG. 1 is a side elevation of a connector constructed in accordance with the concepts of the invention.
Figure 2:
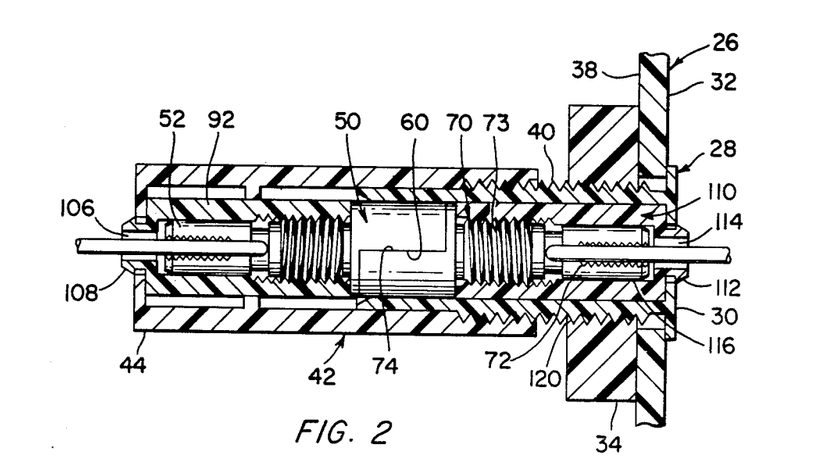
FIG. 2 is a side elevation, in section, of the connector of FIG. 1 taken along the lines 2—2.
Figure 3:
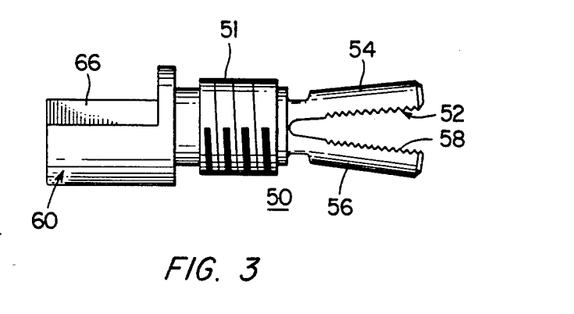
FIG. 3 is a side elevation, partially cut away, of the connector body of the connector of FIG. 1.
Figure 6:
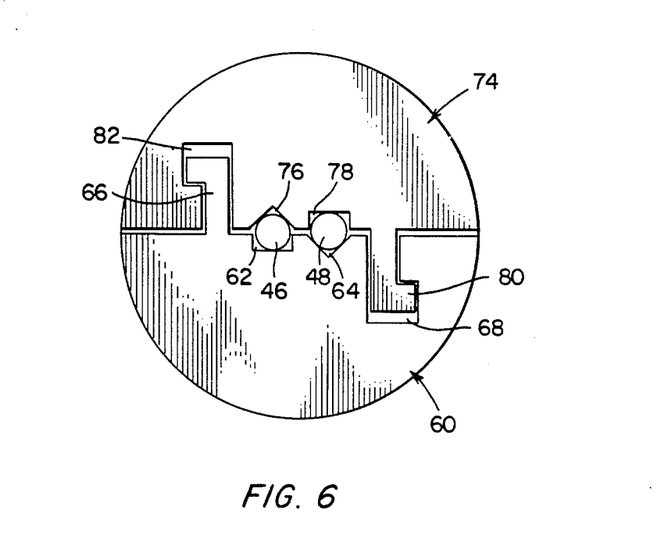
FIG. 6 is a front elevational view of the two front sections of the connector bodies of FIG. 3 assembled with two fibers in place.

The outer jacket of the fiber optic cable 22 is removed to expose two fibers 46,48, as shown in FIG. 6. The cable 22 is now placed into the connector body 50, as is shown in FIG. 3, between the halves 54,56 of the split collet 52. The free end portions of halves 54,56 are serrated as at 58 to better grip the outer jacket of the cable 22 and provide strain relief for the fibers 46,48 so that they will not be injured by forces applied to the cable 22. Split collet 52 is closed by the cam portion of the cam nut, to be described below. In the fiber support section 60 of connector body 50 there is a rectangular recess 62 and a V-notch 64 between an alignment tab 66 and an alignment recess 68. The mating fiber support section 74 of connector body 70 (See FIG. 2) has therein a V-notch 76 and a rectangular recess 78 between an alignment tab 80 and an alignment recess 82 (See FIG. 6). As shown in FIGS. 2 and 6, one of the connector bodies 50,70 is inverted with respect to the other so that the fiber support sections 60,74 form a complete circle. The alignment tab 66 enters the alignment recess 82 and the alignment tab 80 enters alignment recess 68. This action properly holds the connector bodies 50,70 together and aligns them such that the various V-notches and rectangular recesses are aligned.

Figure 3A:
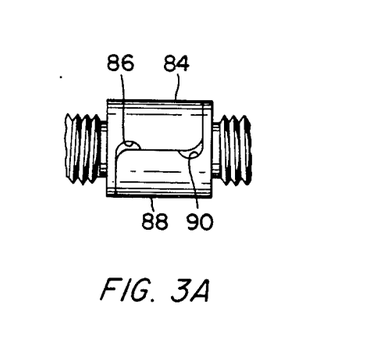
FIG. 3A is a fragmentary side elevation of a modified connector body.
Figure 4:
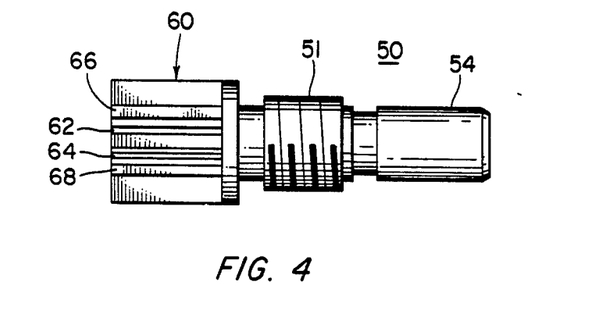
FIG. 4 is a top plan view of the connector body of FIG. 3.
Figure 5:
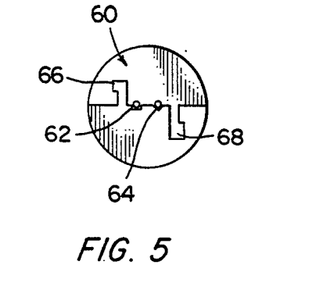
FIG. 5 is a front elevational view of the connector body of FIG. 3.

The rectangular recess 62 of fiber support section 60 is closed by the V-notch 76 of fiber support section 74 and, similarly, the V-notch 64 is closed by rectangular recess 78. As a result of such closures, both of the fibers 46,48 are subjected to deformation along three lines of action, two by the contact with the side walls of the V-notch and one by the rectangular recess. Since both fibers to be joined are subjected to the same forces throughout their positions in the fiber support sections 60,74, the fibers tend to be aligned along their longitudinal axis, thus providing a low loss coupling between the fibers. The fibers 46,48 can be cut rather easily with a razor blade, or other sharp cutting tool. The fibers to be joined are cut such that their free ends traverse about one half the length of the fiber support sections 60,74. In this way, the fibers generally meet end-to-end or with a small separation. In the event end loading is desired, the fibers can be cut a bit longer and the ends made to meet with forces applied in the direction of the fiber ends. However, if the fibers are cut too long, it may be advantageous to include an accumulator region into which the excess fiber length can extend to reduce the end-to-end loading. In FIG. 3A, the fiber support section 84 has an accumulator recess 86, while fiber support section 88 has an accumulator recess 90. Any excess fiber can be deformed to some position in the accumulator recess and thus reduce the excess loading. Also, if desired, barriers can be set up to prevent fibers in the accumulator recess from being deflected into adjoining fibers.

Figure 7:
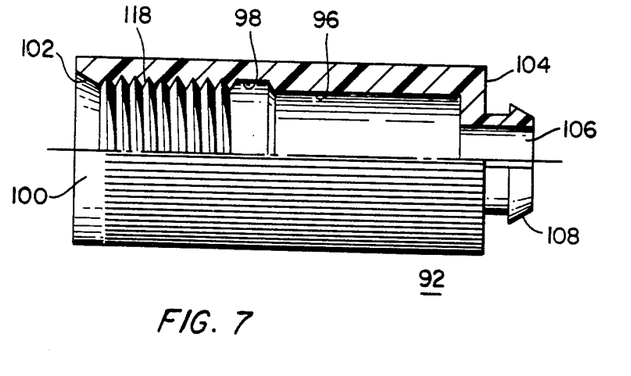
FIG. 7 is a side elevational view, partially in section, of the strain relief nut of the connector of FIG. 1.
Figure 8:
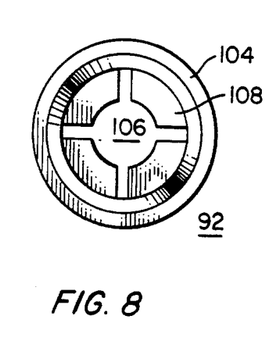
FIG. 8 is a rear elevational view of the strain relief nut of FIG. 7.

Turning now to FIGS. 7 and 8, there is shown the strain relief nut 92 having a generally cylindrical outer surface 94 with a bore 96 extending the length thereof. Bore 96 is enlarged as at 98, adjacent the open end 100 nut 92. The lead-in to the enlarged bore 98 is chamfered as at 102. The second end 104 is closed except for an aperture 106 which extends through a split ring 108. Split ring 108 extends through an aperture in the cam nut 42, as will be described below, to couple said cam nut 42 to said strain relief nut 92. The second strain relief nut 110 has a split ring 112 through which extends an aperture 114 to the bore 116. The second strain relief nut 110 split ring 112 extends through an aperture in the mounting bolt, to be discussed below, to assemble said second strain relief nut 110 to said mounting bolt. The interior surface of the bore enlargement 98 is internally threaded, as at 118, to engage threaded portion 51 of connector body 50. The bore 96 of connector body 50 engages the split collet 52 causing the halves 54,56 to engage and hold the jacket of the optical fiber cable. The serrations 58 on the collet 52 halves 54,56 enhance the holding power of the collet 52. Split collet 72 of connector body 70 is caused to close on the second cable jacket as the strain relief nut 110 is threadedly engaged with the threads 73 of connector body 70. To use the connector the cable has a portion of its jacket removed to expose the fibers 46,48. The fibers 46,48 are positioned in the appropriate recesses and the strain relief nuts 92 and 110 assembled to the connector bodies 50,70 respectively to hold the exposed fibers in place while gripping the jackets of the cables.

Figure 10:
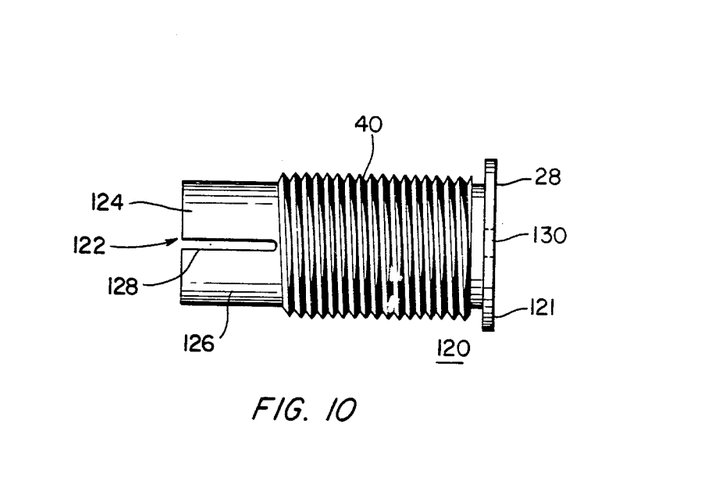
FIG. 10 is a side elevational view of the mounting bolt of the connector of FIG. 1.
Figure 11:
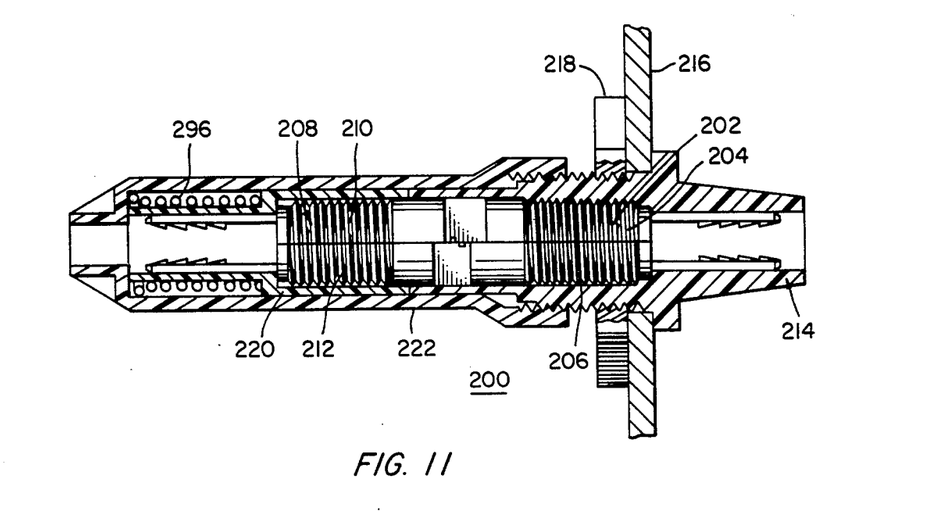
FIG. 11 is a side elevation, in section and partially cut away, of a second form of a connector constructed in accordance with the concepts of the invention.

At this time, the mounting bolt 120 and the jam nut 34 are employed to mount the connector 20 to the wall 26. A hole of proper dimensions is made in the wall 26 and the mounting bolt 120 is inserted from back face 32 of wall 26. The flange 28 engages back face 32 to prevent the mounting bolt 120 being pulled through the aperture. Now a jam nut 34 is made to threadably engage the threads 40 of the mounting bolt 120 and tightened by use of a wrench on the wrench flats 36 of jam nut 34 and the wrench flats 121 of flange 28. At the opposite end of the mounting bolt 120 is located a split collet 122 made up of two halves 124,126 with a slot 128 therebetween.

The strain relief nut 110 is now positioned inside mounting nut 120 with the split ring 108 passing through aperture 130 in the flange 28 of the mounting bolt 120. As is evident from FIG. 8, the split ring 108 is divided into four sectors of a circle with open slots therebetween. The leading edges of the sectors are inclined. The shape of the sectors and the flexibility of the materials from which the strain relief nut 110 is made permits the closure of the split ring 108, as the sectors pass through aperture 130. As soon as the split ring 108 passes through the aperture 130, the sectors open again and lock the strain relief nut 110 to mounting bolt 120. The cable 24 would have first been passed through aperture 130 before the strain relief nut 110 enters the bore of the mounting bolt 120.

Figure 9:
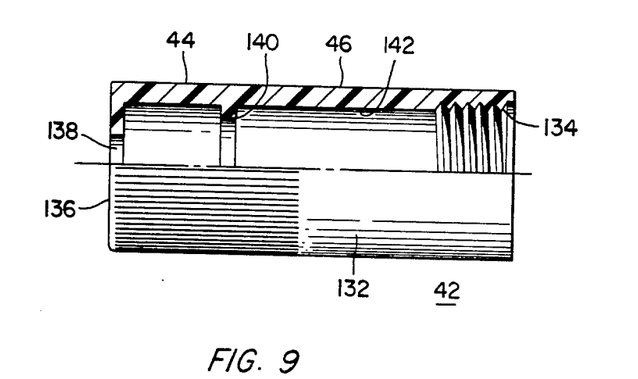
FIG. 9 is a side elevational view, partially in section, of the cam nut of the connector of FIG. 1.

The assembled connector body 50 and strain relief nut 92 are then mounted to the cam nut 42 shown in FIG. 9. Cam nut 42 has a generally cylindrical body portion 46 and a rear, knurled portion 44 to assist the tightening of the cam nut 42 on the threaded portion 40 of the mounting bolt 120. A bore 132, through the cam nut 42, is enlarged and threaded as at 134 and the closed end 136 has an aperture 138 therethrough. An annular rib 140, which contacts strain relief nut 92, serves to center the position of the nut 92 in the cam nut 42. A tapered section 142 is provided to engage the fiber support sections 60,74 and assure proper engagement therebetween and with the fibers. Thus, strain relief nut 92 is placed in cam nut 42, allowing split ring 108 to latch the strain relief nut 92 to the cam nut 42. The engagement of the threaded portion 134 of cam nut 42, with threads 40 of the mounting bolt 120, completes the assembly of the connector 20.

Referring now to FIGS. 11 to 27, there is shown a further connector 200 constructed in accordance with the concepts of the invention. Connector 200 has a first body portion 202 made up of upper half 204 and lower half 206, respectively, and a second body portion 208 made up of upper half 210 and lower half 212, respectively. A mounting nut 214 couples the connector 200 to a wall panel 216 employing a lock nut 218, or the like. The mounting nut 214 also serves to hold the halves 204 and 206 of the first body portion 202 together. Jam nut 220 fits over the halves 210,212 of the second body portion 208 holding them together. Coupling nut 222 fits over the jam nut 220 and threadably engages mounting nut 214 to assemble the connector 200.

Lower half 206 of the first body portion 202 has a main portion 224 (see FIGS. 13 to 15) threaded as at 226 and terminating at a first end in a flat portion 228 in which are placed two V-notches 230. Each of V-notches 230 receives one of each pair of fibers to be joined. As is clearly visible in FIG. 14, each of the V-notches 230 has a taper as at 232 to guide the fibers into the V-notches 230. Two apertures 234 are formed in flat portion 228 to receive the assembly pins of upper half 204, as will be described below. Extending from the second end of main portion 224 is an arm 236 having a plurality of teeth 238 thereon. Recesses 240 are formed in teeth 238 to conform to the jacket of the fiber to be received. When upper half 204 is mated with lower half 206, the jacket of the fiber will be gripped and the fiber will be protected against forces applied along the fiber cable length.

Figure 12:
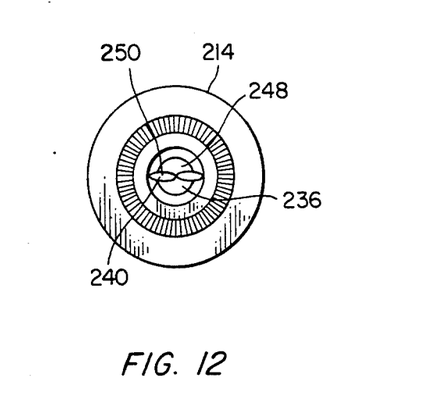
FIG. 12 is an end view of the connector of FIG. 11.
Figure 13:
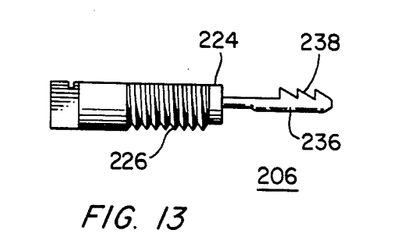
FIG. 13 is a side elevation of one half of a first body portion of the connector of FIG. 11.
Figure 14:
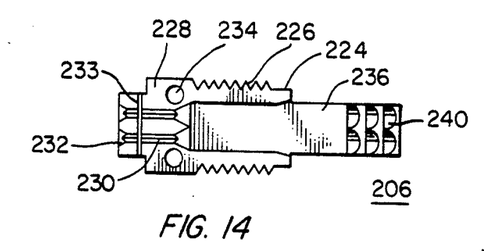
FIG. 14 is a top plan view of the device of FIG. 13.
Figure 15:
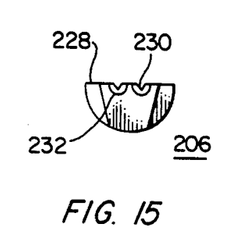
FIG. 15 is an end view of the body portion of FIG. 13.
Figure 16:
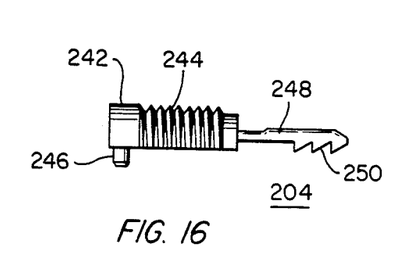
FIG. 16 is a side elevation, inverted, of the other half of the first body portion of the connector of FIG. 11.
Figure 17:
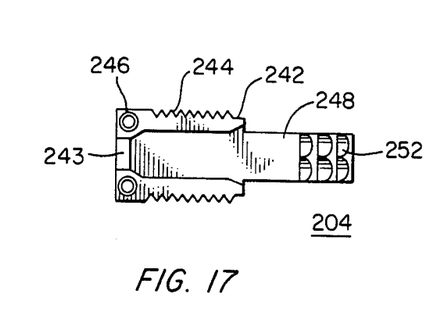
FIG. 17 is a bottom plan view of the device of FIG. 16.
Figure 18:
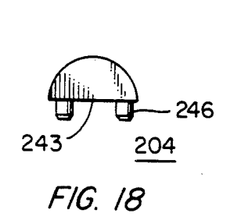
FIG. 18 is an end view of the body portion of FIG. 16.
Figure 19:
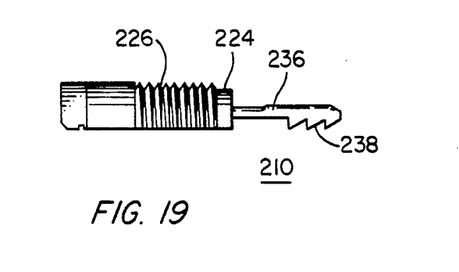
FIG. 19 is a side elevation, inverted, of one half of the second body portion of the connector of FIG. 11.
Figure 20:
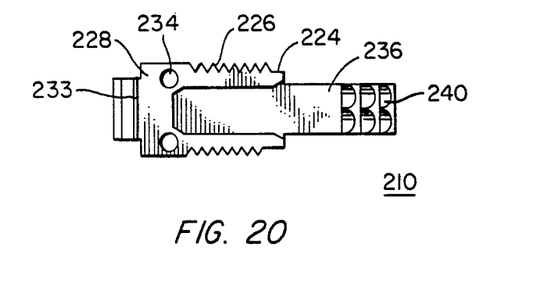
FIG. 20 is a bottom plan view of the device of FIG. 19.
Figure 21:
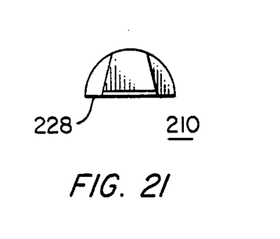
FIG. 21 is an end view of the body portion of FIG. 19.
Figure 22:
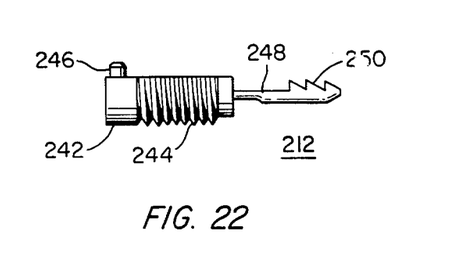
FIG. 22 is a side elevation of the other half of the second body portion of the connector of FIG. 11.
Figure 23:
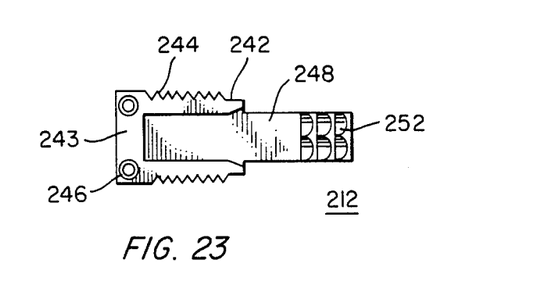
FIG. 23 is a top plan view of the device of FIG. 22.
Figure 24:
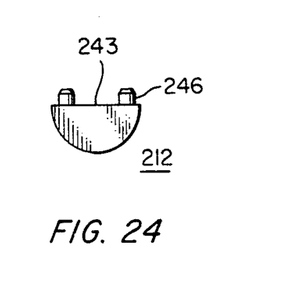
FIG. 24 is an end view of the body portion of FIG. 22.

The upper half 204 (See FIGS. 16 to 18) of the body portion 202 has a main portion 242 threaded as at 244. The threads 244 of upper half 204 so align with the threads 226 of the lower half 206 as to provide a smooth continuous thread for assembly with the mounting nut 214, as will be described hereafter. At one end of main portion 242 is a flat portion 243 which is arranged to overlie flat portion 228 of lower half 206. When halves 204 and 206 are assembled, flat portion 242 will provide the third point of contact for any fiber in the V-notches 230 of lower portion 206. The use of a flat portion 243 adjacent the V-notches 230 eliminates the alignment problems that could arise where a V-notch is to be placed adjacent a recess as in FIG. 6 where V-notch 76 confronts rectangular recess 62. Projecting from flat portion 243 of upper half 204 are two assembly pins 246 which are received within the apertures 234 of lower half 206 to hold lower half 206 in assembly with upper half 204. An arm 248 projects from the other end of main portion 242 and has on one surface thereof a plurality of teeth 250. Recesses 252 are provided to receive the jacket of an optical cable and provide strain relief when used in conjunction with the recesses 240 of arm 236. As shown in FIG. 12, two eliptical channels are formed when the arm 236 of lower half 206 and the arm 248 of upper half 204 are assembled in mounting nut 214 bringing recesses 240 adjacent recesses 250.

The second body 208 is made up of upper half 210 (See FIGS. 19 to 21) and lower half 212 (See FIGS. 22 to 24) are held together by jam nut 220. Upper half 210 is virtually identical with lower half 206 and will not be described in detail. The only difference is the omission of the V-notches 230 in the flat portion 228. Lower half 212 is identical with upper half 204. Although body portions 202 and 208 are shown associated with mounting nut 214 and jam nut 220 respectively, the body portions can be reversed without creating any problems. When body portions 202 and 208 are assembled, fibers from cables to be joined will be positioned within the V-notches 230 of lower half 206 of body portion 202, and will be held in place by the flat portion 228 of upper half 210 of body portion 208. Flat portion 228 extends a sufficient distance to overlie the fibers from both cables to be joined.

Figure 25:
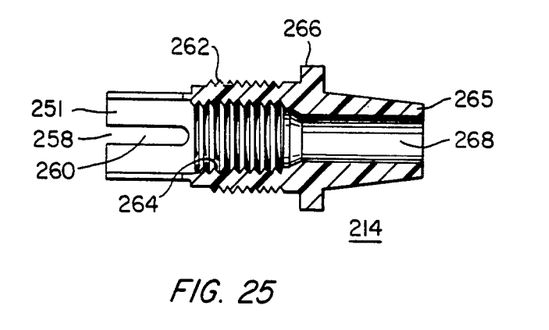
FIG. 25 is a side elevation, in section, of the mounting nut of the connector of FIG. 11.

Mounting nut 214, as is shown in FIG. 25, is quite similar to mounting bolt 120 shown in FIG. 10. At a first end 257 a split collet 258 is formed by four slots 260 placed at 90 degree positions about the first end. Each of the resulting four sections (only two of which are visible in the figure) will converge along the longitudinal axis of the mounting nut 214 as the coupling nut 222 is assembled to the mounting nut 214, as will be described, to insure the proper alignment of the fibers in the V-notches 230,256. The central portion of mounting nut 214 is externally threaded as at 262 to engage the threaded portion of the coupling nut 222 and internally threaded as at 264 to engage the threads 226 of lower half 206 and 244 of upper half 204 to retain them in their assembled condition. Adjacent the threaded portion 262 is a flange 266 to engage one surface of a mounting panel such as 216, shown in FIG. 11. The mounting panel will be trapped between the flange 266 and a lock nut or the like (not shown) engaged with external threads 262 of the mounting nut 214. The other end 265 of mounting nut 214 is tapered towards its longitudinal axis. The outer surface 266 is knurled to permit the mounting nut 214 to be handled more easily. Extending through end 265 is a bore 268 which receives the arms 236 and 248. In that the bore 268 is tapered towards the longitudinal axis of the nut 214 in the direction of end 265, the arms 236,248 tend to close on the jacket of a cable used with the connector and thus provide strain relief for such cable.

Figure 26:
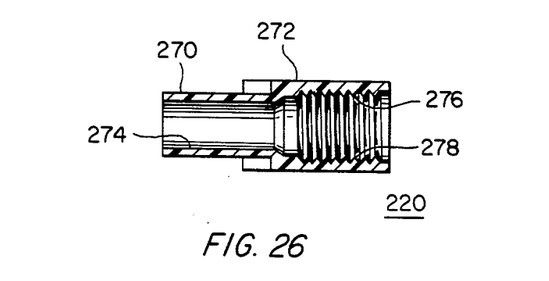
FIG. 26 is a side elevation, in section, of the jam nut of the connector of FIG. 11.

FIG. 26 shows jam nut 220 which is used to hold upper half 210 and lower half 212 in assembly. Jam nut 220 has a first cylindrical portion 270 of a first diameter and a second cylindrical portion 272 of a second diameter. Bore 274 extends through portion 270 while bore 276, larger than bore 274, extends through portion 272. The interior of cylindrical portion 272 is threaded as at 278 to engage the threads on upper half 210 and lower half 212 to hold them in assembly. Bore 274 is tapered towards the longitudinal axis of the jam nut 220 to cause the arms of the upper half 210 and lower half 212 to close upon the jacket of a second optical fiber cable to be joined.

Figure 27:
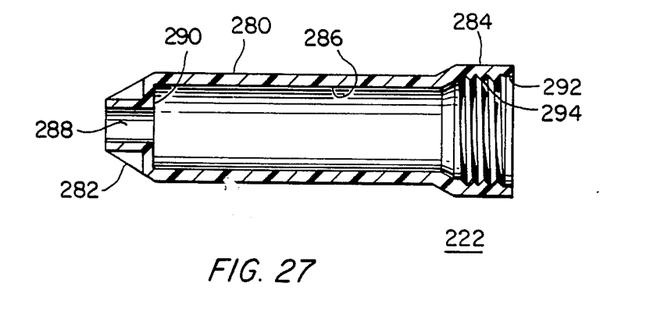
FIG. 27 is a side elevation, in section, of the coupling nut of the connector of FIG. 11.

Coupling nut 222 is shown on FIG. 27. A central cylindrical portion 280 terminates in an externally tapered portion 282 at one end and in an enlarged cylindrical portion 284 at the other. Within central porton 280 is a first bore 286, while a second smaller diameter bore 288 extends through the portion 282. The transition from bore 286 to bore 288 provides the shoulder 290. A bore 292, larger than bore 286, extends through portion 284 and the inner surface of portion 284 is threaded as at 294 to engage threads 264 of the mounting nut 214 to assemble the entire connector 200.

To use the connector 200, about three inches of the jacket of an optic fiber cable is removed exposing the two optic fibers. The fibers are fed between the upper half 204 and the lower half 206 of the first body 202. Upper half 204 and lower half 206 are assembled by means of the assembly pins 246 of upper half 204 entering the apertures 234 of lower half 206. When so assembled sufficient clearance is provided to allow the fibers to pass between upper half 204 and lower half 206 into the V-notches 230 of lower half 206. The cable is advanced in body portion 202 until the jacket of the cable is between arms 236 and 248. In such position the fibers extend beyond the halves 204,206. A tool (not shown) may be employed to provide a gauge for the trimming of the fibers or the trimming may be done in the connector itself by using a razor blade in the slot 233 (See FIG. 14). To hold parts 204,206 and the fibers together, the mounting nut 214, which had previously been placed on the cable is moved toward the halves 204,206 and the threads 264 of the mounting nut 214 are made to engage the threads 244,224 of the upper and lower halves 204,206 respectively, The threads 264 are tapered so that as the mounting nut 214 is tightened to the body portion 202 the halves 204,206 are made to tightly grip the fibers. The entry of arms 236,248 into tapered bore 268 of the mounting nut 214 closes the arms 236,248 to the positions shown in FIG. 12 thereby gripping the cable jacket to provide the required strain relief. The central portion of mounting nut 214 is placed through an aperture in panel 216 and a lock washer 218 threaded on threads 262 is used to retain connector 200 to panel 216.

The second cable is also stripped of its jacket for about three inches and inserted between the upper half 210 and lower half 212 of body portion 208. By using a tool as generally set out above, or a razor blade in slot 233 (See FIG. 20) the fibers can be trimmed to the desired length. The first body portion 202 with fibers extending in the V-notches 230 up to the slot 233 of lower half 206 is now joined with the second body portion 208. The fibers of the second body portion 208 extend along the surface 228 of upper half 210. The depth of the V-notches 230 and the sectors of a full circle which each of the halves 206,210 occupy provide for a portion of the fiber alignment, the compression of the fibers in connector 200 provides the remaining alignment corrections. As flat portion 228 of upper half 210 is moved over flat portion 228 of lower half 206 the fibers enter the V-notches 230 assisted by the tapers 232 which align the fibers with the V-notches. As a result, one fiber of each cable is placed in one of the V-notches 230 while the other fiber of each cable is placed in the second V-notch 230. The fibers will be brought in an end-to-end relationship and may touch or be spaced apart.

Jam nut 220 is assembled to body portion 208, employing the internal threads 276 coupled with the threads of upper half 210 and lower half 212. The tapered threads 276 of jam nut 220 close the upper half 210 and lower half 212 tightly about the fibers. Also, the tapered bore 274 of jam nut 220 closes the arms of upper half 210 and lower half 212 about the cable jacket to provide strain relief to the cable. The coupling nut 222, which had been previously placed over the second cable, is now brought up close to the jam nut. The upper half 210 is now positioned over the lower half 206 so the fiber ends of both cables are placed close to one another in the V-notches 230. Coupling nut 222 is now brought up over the body portion 208 and its threads 292 are made to engage threads 262 of mounting nut 214. A compression spring 296 may be inserted in coupling nut 222 engaging shoulder 290 at one end and jam nut 220 at the other to urge the second body portion 208 against the first body portion 202 to insure that the fibers enter V-notches 230 adjacent the fibers in the first body portion 202.

While there have been shown and described and pointed out the fundamental novel features of the invention as applied to the preferred embodiment, it will be understood that various omissions and substitutions and changes of the form and details of the devices illustrated and in their operation may be made by those skilled in the art without departing from the spirit of the invention.

The embodiments of the invention in which an exclusive property or privilege is claimed are defined as follows:

1. A connector for joining two flexible, elastically deformable elongate members in end-to-end relationship comprising: a first member having a V-notch therein for receiving a first elongate member; said first member V-notch providing two points of contact with a first elongate member; a second member having a rectangular recess therein for receiving a second elongate member; said second member recess providing one point of contact with a second elongate member; and assembly means for assembling a first and a second elongate member in an end-to-end relationship and subjecting such first and second members to deformation forces at the three points of contact with said first and said second members; said first member further comprises: a strain relief section comprising: a split collet made up of a split tab to assemble said strain relief section to said assembly means and a strain relief nut engageable with said split collet to close said collet about a first elongate member placed in said first member.

2. A connector as defined, in claim 1, wherein said first member has an assembly tab thereon and said second member has a first assembly recess therein for receiving said assembly tab of said first member to align said first and said second members.

3. A connector as defined in claim 1, wherein said second member further comprises a strain relief for gripping a second elongate member.

4. A connector as defined in claim 1, wherein said assembly means comprises a mounting bolt, a cam nut coupled by said split tab to said strain relief section and a jam nut.

5. A connector as defined in claim 1, wherein said second member comprising: a strain relief section comprising; a split collet and a strain relief nut engageable with said split collet to close said collet about an elongate member placed in said second member.

6. A connector as defined in claim 1, wherein said assembly means comprises: a mounting bolt coupled to one strain relief section by its split tab; a cam nut coupled to the other strain relief section by its split tab; and a jam nut.

7. A connector as defined in claim 1, wherein said assembly means comprises: a mounting bolt and a cam nut.

8. A connector as defined in claim 1, wherein said assembly means comprises: a mounting bolt, a cam nut and a jam nut.

9. A connector as defined in claim 1, wherein said first and said second members each have an assembly tab thereon and said first and said second members each have an assembly recess therein to receive the corresponding assembly tabs to align said first and said second members.

10. A connector as defined in claim 4, wherein said V-notch in said first member and said rectangular recess in said second member are each positioned between said assembly tabs and said assembly recesses.

11. A connector for joining at least one first pair of flexible elastically deformable elongate members in end to end relationship with a like number of second pairs of flexible, deformable, elongate members comprising: a first member having a first surface; a first V-notch in said first surface; a first rectangular recess in said first surface; said first V-notch arranged to receive an elongate member and make a two point contact therewith; said first rectangular recess arranged to receive an elongate member and make a one point contact; said first V-notch and first rectangular recess extending in parallel and spaced apart across said first surface; a second member having a second surface; a second V-notch in said second surface; a second rectangular recess in said second surface; said second V-notch arranged to receive an elongate member and make a two point contact therewith; said second rectangular recess arranged to receive an elongate member and make a one point contact; said second V-notch and said second rectangular recess extending in parallel and spaced apart across said second member; said second member placed atop said first member wherein said first surface and said second surface lie in parallel planes and with one of each pair of first elongate members placed in said first V-notch and said first rectangular recess respectively and one of each pair of second elongate members placed in said second rectangular recess and said second V-notch respectively, in end to end relationship; and assembly means coupling said first member and said second member together and subjecting each elongate member to deformation forces at the three points of contact of said first and second pairs of elongate members; said first member further comprises: a strain relief section comprising; a split collet, the interior surfaces of which have serrations thereon made up of a split tab to assemble said strain relief section to said assembly means and a strain relief nut engageable with said split collet to close said collet about a first pair of elongate members placed in said first member.

12. A connector as defined in claim 11, wherein said first member has an assembly tab thereon and said second member has a first assembly recess therein for receiving said assembly tab of said first member to align said first and said second members.

13. A connector as defined in claim 11, wherein said first and said second members each have an assembly tab thereon and said first and said second members each have an assembly recess therein to receive the corresponding assembly tabs to align said first and said second members.

14. A connector as defined in claim 11, wherein said first member has a first assembly tab thereon, said first tab having a first portion extending perpendicular to said first surface and a second portion extending parallel to said first surface; and said second member has a first assembly recess therein having a third portion extending perpendicular to said second surface and a fourth portion extending parallel to said second surface, the engagement of said first assembly tab with said first assembly recess holding said first and said second members together and in alignment.

15. A connector as defined in claim 11, wherein said second member comprises: a strain relief section comprising; a split collet, the interior surfaces of which have serrations thereon; and a strain relief nut engageable with said split collet to close said collet about a second pair of elongate members.

16. A connector as defined in claim 11, wherein said first member has a first assembly tab thereon, said first tab having a first portion extending perpendicular to said first surface and a second portion extending parallel thereto; said first member having a first assembly recess having a third portion extending perpendicular to said first surface and a fourth portion extending parallel thereto; said second member having a second assembly tab thereon, said second tab having a fifth portion extending perpendicular to said second surface and a sixth portion parallel thereto; and said second member having a second assembly recess having a seventh portion extending perpendicular to said second surface and an eighth portion parallel thereto; said first assembly tab engaging said second assembly recess and said second assembly tab engaging said first assembly recess to hold said first member and said second member together and in alignment.

17. A connector as defined in claim 16, wherein said first V-notch and said first rectangular recess are located on said first surface of said first member between said first assembly tab and said first assembly recess and said second V-notch and said second rectangular recess are located on said second surface of said second member between said second member between said second assembly tab and said second assembly recess.

* * * * *